UNITED STATES PATENT OFFICE.

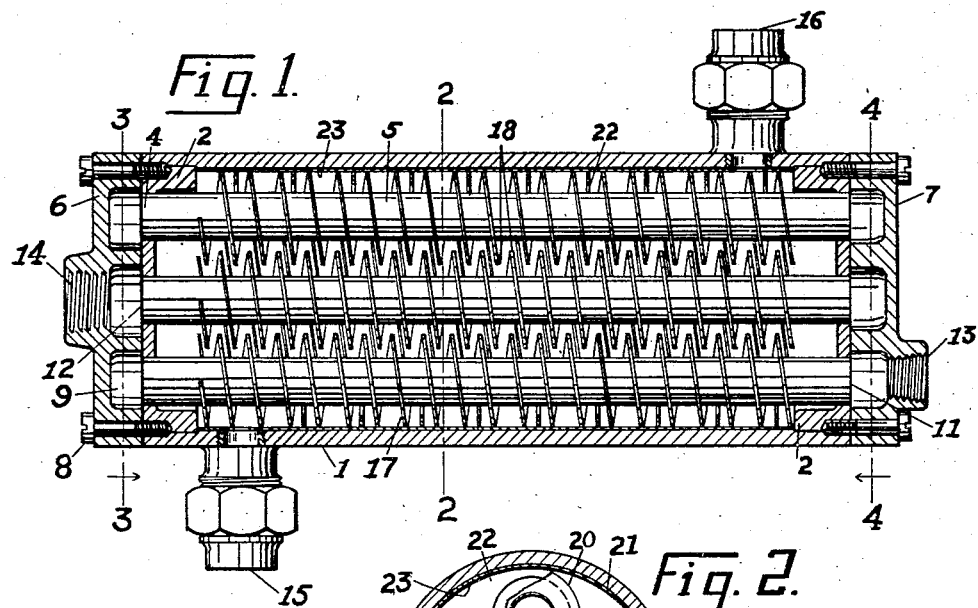
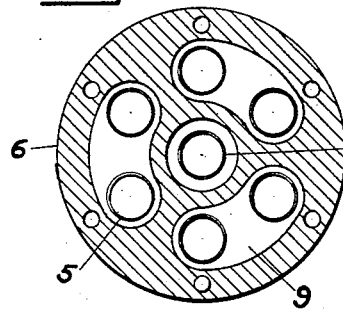
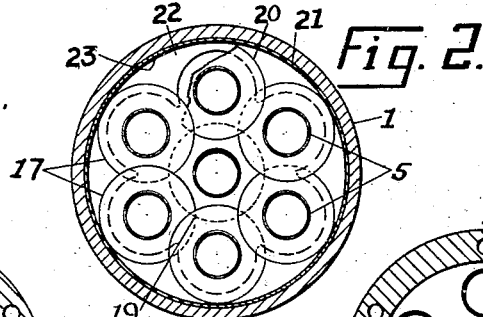
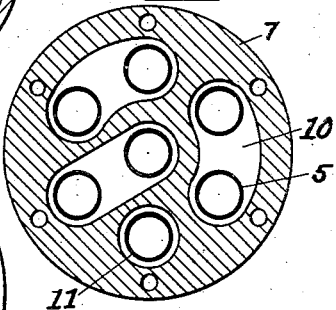
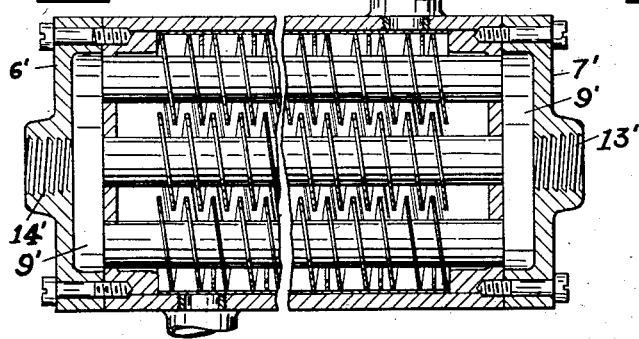
INVENTOR
ROBERT B. LEA.
BY Herbert H. Thompson
ATTORNEY.

ROBERT B. LEA, OF BROOKLYN, NEW YORK, ASSIGNOR TO THE SPERRY GYROSCOPE COMPANY, OF BROOKLYN, NEW YORK, A CORPORATION OF NEW YORK.

OIL-COOLER.

1,367,881.   Specification of Letters Patent.   Patented Feb. 8, 1921.

Application filed October 18, 1917. Serial No. 197,194.

*To all whom it may concern:*

Be it known that I, ROBERT B. LEA, a citizen of the United States of America, residing at 29 Monroe Place, Brooklyn, in the county of Kings and State of New York, have invented certain new and useful Improvements in Oil-Coolers, of which the following is a specification.

This invention relates to oil coolers, especially to apparatus for extracting heat from oil which is in turn employed for lubricating and extracting heat from the bearings of machine elements.

The object of the invention is to provide a simple and compact apparatus, which is at the same time more effective than apparatus used at present for the same purpose.

The cooler hereinafter described has been found to possess these advantages, and to be lighter and much cheaper to manufacture and to require less pressure to circulate the oil and water, than other types of oil coolers.

Referring to the drawings wherein I have shown what I now consider to be the preferred form of my invention:

Figure 1 is a side elevation partly in section of the cooler.

Fig. 2 is a transverse sectional view thereof taken on line 2—2, Fig. 1.

Fig. 3 is a section taken on line 3—3, Fig. 1.

Fig. 4 is a section taken on line 4—4, Fig. 1.

Fig. 5 is a detail showing an end plate.

Fig. 6 is a modified form of the invention.

In the drawings, I represents a casing shown as cylindrical in each end of which I have shown a member or plate 2, Figs. 1 and 5, adapted to completely fill the openings. A plurality of holes 3 are provided in members 2 to receive the ends 4 of tubes 5. Each of tubes 5 is shown as passing through the interior of casing 1, and terminating at each end in one of the holes 3 in the end plates or member 2, and may be securely fastened by solder or other means in said end plates, to prevent movement of said tubes, and to prevent the leakage of liquid through the junctions.

End caps 6 and 7 may be placed over end plates 2 and held in place by screws 8. Cap 6 as shown in Figs. 1 and 3 is provided with recesses 9, designed to act as passages to direct liquid emerging from one of tubes 5 into an adjacent tube 5, while cap 7 on the other end is provided with similar passages 10 to receive and divert the liquid from one tube into another. The arrangement of the passages 9 and 10 is such that a liquid entering one of the tubes under pressure, will be forced back and forth through all of the tubes in series.

The series of tubes is shown as terminating at 11 and 12 in end caps 7 and 6 respectively, while threaded openings 13 and 14 in caps 7 and 6 may provide for connecting pipes to the cooler for conducting water or other cooling agencies into and out of said tubes.

It is designed to force the oil which is to be cooled into the casing 1 at 15 and out through opening 16. The oil in passing through said casing will thus pass around tubes 5 which, being cooled by the cold water passing therethrough, will extract heat from said oil.

In order to expose a large amount of cooling surface to the passing oil, I have shown spiral ribs 17 attached to and radiating from tubes 5 throughout substantially their entire lengths. The arrangement is such that ribs 17 on each tube 5 extend out and between the ribs 17 on the adjacent tubes 5, as shown at 18, Fig. 1. Thus the oil in passing through the cooler is forced to sweep in and out between ribs 17 and over the outer edges thereof. In this manner the oil is well churned, and all parts thereof forced into contact to a maximum degree with the cold metal.

As shown at 19 in Fig. 2, the ribs 17 preferably overlap to such an extent that no straight passages are left for the oil between tubes 5. In order also to prevent straight passages between the outer edges 20 of ribs 17 and the inner wall 21 of casing 1, I have shown baffle plates 22 extending from the inner surface of the casing, out between fins 17. In order to facilitate the construction and assembling of the various parts, the baffle plates may be attached to an inner lining 23.

In Fig. 6 I have shown a modification of my invention, wherein but one recess 9' is shown in each of end caps 6' and 7'. Each of these recesses spreads over one end of all of tubes 5, so that water entering at 13' will pass through all of the tubes in parallel and leave the cooler at 14'. In this form as well as in the other, the oil should preferably leave the cooler at the same end that the water enters, as for instance, where the water enters at 13', the oil should leave at 24. The object of this is, of course, to subject the oil, after it has entered the cooler and begun to be cooled, to the effects of increasingly cold water as the oil moves on.

In accordance with the provisions of the patent statues, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an oil cooler, a casing, a plurality of metal tubes for passing water through in said casing, means for causing the oil to be cooled to pass through said casing without said tubes, and thin metal fins on said tubes, projecting outwardly and between corresponding fins on the adjacent tubes.

2. In a fluid cooler, a casing, a plurality of metal tubes in said casing adapted to act as a passage for a cooling fluid, means for causing a fluid to be cooled to pass through said casing without said tubes, thin metal fins on said tubes, projecting outwardly and between corresponding fins on the adjacent tubes, and baffle plates on said casing extending inwardly between said fins.

3. In an oil cooler, a tubular chamber for the oil to pass through and having openings adjacent the opposite ends thereof, a plurality of metal tubes passing through said chamber, means surrounding said tubes adjacent the ends of said chamber for rendering said chamber liquid proof, caps on each end of said tubes, said caps being provided with channels for conducting a fluid emerging from one of said tubes into another thereof, separate means provided for conducting a fluid into and out of said tubes, and heat conducting projections on said tubes positioned to cause churning of the oil.

4. In a fluid cooler, a casing, a plurality of metal tubes in said casing adapted to act as a passage for a cooling fluid, means for causing a fluid to be cooled to pass through said casing without said tubes, thin metal fins on said tubes, projecting outwardly and between corresponding fins on the adjacent tubes, and means for preventing said second mentioned fluid from moving in a straight course between said casing and said fins.

In testimony whereof I have affixed my signature.

ROBERT B. LEA.